Patented Nov. 21, 1933

1,935,962

UNITED STATES PATENT OFFICE 1,935,962

METHOD FOR INCREASING THE CHARGE AND CATAPHORETIC VELOCITY OF COLLOIDS

Oliver M. Urbain, Columbus, Ohio, assignor to Charles H. Lewis, Harpster, Ohio

No Drawing. Application January 5, 1932
Serial No. 584,904

3 Claims. (Cl. 252—6)

This invention relates to a process for increasing the charge and cataphoretic velocity of colloids in dispersion.

It is known that colloids have their maximum cataphoretic velocity when carrying a maximum charge. It has heretofore been impossible to effect maximum charging of colloids without bringing the solution within which they are dispersed to an OH ion concentration of around pH 9.5. This is objectionable not only because of the quantity and cost of the reagents necessary to bring the solution to this high pH but also because any effluent product is of objectionable alkalinity.

It is the purpose of the instant invention to provide a process whereby colloids can be given a maximum charge with the employment of but a relatively small amount of reagent and without increasing the pH of the solution above substantially 8.5; to provide a process which reduces the weight and bulk of treating materials and by which the cost of imparting a maximum charge to the colloids is materially reduced.

The purpose of imparting to the colloidal matter in a solution its maximum cataphoretic velocity is to permit of the flocculation thereof by an electrolyte. An electrolyte suitable for this purpose may be defined as an ionizable salt having a cation of high valence and an anion of low valence such, for example, as $SnCl_4$, $AlCl_3$ or $FeCl_3$.

The present invention is not so much concerned with the selection of an electrolyte for flocculating colloids as it is with the method for increasing the charge of the colloid and its cataphoretic velocity so that flocculation thereof by the electrolyte will be made feasible.

It has been ascertained that the colloids can be given a maximum charge at hydroxyl ion concentration not in excess of pH 8.5 by the incorporation in the solution in which the colloids are dispersed of high valent anions meeting certain definite specifications. I have found that if anions meeting the following specifications are employed in suitable amounts, the colloids can be given a complete charge and their maximum cataphoretic velocity.

The reagent for releasing the anions must be ionizable in water; the anion thereof must not be subject to reionization or break down into simpler ions of lower valence, in less than five minutes with constant agitation; the valence of the anion must be at least two units higher than the valence of the cation, and preferably greater to avoid antagonism; the cation should have low valence preferably one as Na or K. While not absolutely essential to the functioning of the process, anions of high molecular weight are preferred as they are more strongly adsorbed by the colloids, reducing the time required for bringing the colloid to a state of maximum charge and cataphoretic velocity.

Examples of reagents meeting the above specifications are the tribasic phosphates and the ferrocyanides of the alkali metals. Trisodium phosphate $Na_3PO_4$ and potassium ferrocyanide $K_4Fe(CN)_6$ are illustrative of these. It will be noted that the anion of $Na_3PO_4$ is two units higher in valence than the cation, it is strongly adsorbed and is stable against reionization. The anion of $K_4Fe(CN)_6$ of potassium ferrocyanide has a valence three units higher than the cation and is likewise strongly adsorbed and stable against reionization.

The charging of the colloids to the maximum extent is effected through adsorption by the colloids of the anions and it is necessary that the anions be made available in sufficient amount to completely satisfy the adsorptive capacity of the colloids.

In treating a solution containing colloidal matter to which it is desired to impart a maximum charge the reagent for releasing the anions is added in proportion to the colloidal content of the solution. For example, in treating a solution having a colloidal concentration of 150 p. p. m. and using the trisodium phosphate as the reagent, approximately 300 to 400 pounds should be used for each million gallons of the solution treated. The exact quantity needed will depend on the concentration of colloidal matter and the efficiency of the particular reagent and can best be ascertained by trial, and measurement of the cataphoretic velocity.

A particularly advantageous use of the process, as before pointed out, is to render the colloidal matter susceptible of flocculation by an electrolyte after which it can be removed either by filtration or coagulation and sedimentation as and when desired.

Having thus described my invention what I claim is:—

1. A method for bringing colloids dispersed in water solution to a state of maximum charge and cataphoretic velocity without increasing the pH of the solution substantially above pH 8.5 comprising adding to the solution a regulated quantity of an ionizable salt characterized in that it has a cation of low valence and an anion at least two units higher than the cation, said anion being stable against reionization or break down into simpler ions of lower valence in a time period less than five minutes with constant agitation.

2. A method for bringing colloids dispersed in water solution to a state of maximum charge and cataphoretic velocity without increasing the pH of the solution substantially above pH 8.5 comprising adding to the solution a regulated quantity of an ionizable ferrocyanide of an alkali metal characterized in that it has a cation of low valence and an anion at least two units higher than the cation, said anion being stable against reionization or break down into simpler ions of lower valence in a time period less than five minutes with constant agitation, said anion further characterized in that it has a molecular weight in excess of 100.

3. A method for bringing colloids dispersed in a water solution to a state of maximum charge and cataphoretic velocity without increasing the pH of the solution substantially above pH 8.5 comprising introducing to the solution from .2 to .3 pounds per pound of colloid present in the solution, of an ionizable tribasic phosphate characterized in that it has a cation of low valence and an anion at least two units higher than the cation, said anion being stable against reionization or break down into simpler ions of lower valence in a time period less than five minutes with constant agitation, and agitating the solution for a period of from three to four minutes.

OLIVER M. URBAIN.